US009561472B2

(12) United States Patent
Lee et al.

(10) Patent No.: US 9,561,472 B2
(45) Date of Patent: Feb. 7, 2017

(54) SUBMERGED HOLLOW FIBER MEMBRANE MODULE

(75) Inventors: Jeong Jae Lee, Seoul (KR); Chi Joon Mo, Gunpo-si (KR); Seong Han Lim, Anyang-si (KR); Dong Seong Kim, Anyang-si (KR); You Chul Jeon, Anyang-si (KR)

(73) Assignee: HYOSUNG CORPORATION, Seoul (KR)

( * ) Notice: Subject to any disclaimer, the term of this patent is extended or adjusted under 35 U.S.C. 154(b) by 159 days.

(21) Appl. No.: 13/818,343

(22) PCT Filed: Aug. 22, 2011

(86) PCT No.: PCT/KR2011/006180
§ 371 (c)(1),
(2), (4) Date: Apr. 17, 2013

(87) PCT Pub. No.: WO2012/026721
PCT Pub. Date: Mar. 1, 2012

(65) Prior Publication Data
US 2013/0199994 A1    Aug. 8, 2013

(30) Foreign Application Priority Data
Aug. 23, 2010    (KR) ................. 10-2010-0081589

(51) Int. Cl.
*B01D 63/02*    (2006.01)
*B01D 69/08*    (2006.01)

(52) U.S. Cl.
CPC .............. *B01D 69/08* (2013.01); *B01D 63/02* (2013.01); *B01D 2313/20* (2013.01);
(Continued)

(58) Field of Classification Search
CPC ............ B01D 2201/184; B01D 63/067; B01D 2315/06; B01D 63/02; B01D 2201/44; B01D 2201/313; B01D 2313/16; B01D 2313/23; B01D 2321/2008; B01D 2321/2025; B01D 2315/12
(Continued)

(56) References Cited

U.S. PATENT DOCUMENTS 3,844,347 A * 10/1974 Stotzel et al. ................ 166/227
4,929,354 A *  5/1990 Meyering et al. ....... 210/321.61
(Continued)

FOREIGN PATENT DOCUMENTS

JP          09/220444       8/1997
KR     10-2008-0085881     9/2008
(Continued)

OTHER PUBLICATIONS

International Search Report for international application No. PCT/KR2011/006180, dated May 1, 2012 (4 pages).

Primary Examiner — Krishnan S Menon
Assistant Examiner — Bradley R Spies
(74) Attorney, Agent, or Firm — Hamre, Schumann, Mueller & Larson, P.C.

(57) ABSTRACT

The present invention relates to a submerged hollow fiber membrane module that includes a partition membrane having a slanted slit-shaped opening, and thus capable of not only improving operating efficiency of a hollow fiber membrane module by accelerating the water flow, but also allowing easy discharge of highly concentrated raw water around the hollow fiber membrane to the outside of the module during a reverse wash process.

7 Claims, 1 Drawing Sheet

(52) U.S. Cl.
CPC ...... *B01D 2313/23* (2013.01); *B01D 2313/26* (2013.01); *B01D 2315/06* (2013.01)

(58) Field of Classification Search
USPC ............... 210/321.8, 321.87, 321.89, 500.23
See application file for complete search history.

(56) References Cited

U.S. PATENT DOCUMENTS

| | | | | |
|---|---|---|---|---|
| 5,683,577 | A * | 11/1997 | Nurse, Jr. | 210/170.01 |
| 6,488,848 | B1 * | 12/2002 | Smith | 210/301 |
| 7,578,940 | B2 * | 8/2009 | Hashimoto et al. | 210/636 |
| 2007/0000833 | A1 * | 1/2007 | Levy et al. | 210/435 |
| 2007/0163942 | A1 * | 7/2007 | Tanaka et al. | 210/321.89 |
| 2009/0026139 | A1 * | 1/2009 | Zha et al. | 210/650 |
| 2010/0072124 | A1 * | 3/2010 | Morikawa et al. | 210/321.79 |

FOREIGN PATENT DOCUMENTS

| | | |
|---|---|---|
| WO | 2005/056167 | 6/2005 |
| WO | 2006/047814 | 5/2006 |
| WO | 2008/035593 | 3/2008 |

* cited by examiner (a)　　　(b)

SUBMERGED HOLLOW FIBER MEMBRANE MODULE

TECHNICAL FIELD

The present invention relates to a submerged hollow fiber membrane module, and, more particularly, to a submerged hollow fiber membrane module useful for filtration, etc., in sewage treatment plants and water treatment plants.

BACKGROUND ART

A hollow fiber membrane module is a filtration device using, as separation membranes, hollow fibers which are thin fibers, the surface of which has a myriad of small pores, and the central space of which is empty. This module is configured such that, among a multi-component liquid mixture, a material larger than the pores is excluded, and only a specific material smaller than the pores is selectively passed therethrough and thus effectively recovered. Such a hollow fiber membrane module has been widely utilized in ultrafiltration or microfiltration for preparing sterile water, drinking water, etc., and is recently applied to secondary or tertiary treatment in sewage treatment plants, or to solid-liquid separation of purification tanks. The hollow fiber membrane module used for sewage treatment is classified into an external circulation mode and a module immersion mode, depending on the type in which hollow fiber membranes are applied to aeration tanks.

When a partition membrane is provided at the lower portion of a submerged membrane module, an upward water flow is formed, resulting in cross-flow. As such, when the distance between the lower header and the partition membrane of the module is increased, the upward water flow does not circulate in bundles of hollow fibers which are densely packed. Also, in the case where there is no space between the lower header and the partition membrane, the size of a raw water supply hole of the lower header is limited by the space which is occupied with the bundles of hollow fibers, and thus a sufficient upward water flow is not formed, and operating efficiency may decrease in a reverse washing process.

DISCLOSURE

Technical Problem

Accordingly, an object of the present invention is to provide a submerged hollow fiber membrane module, which may increase operating efficiency of the hollow fiber membrane module and which enables high-concentration raw water around hollow fiber membranes to be easily discharged to the outside of the module in a reverse washing process.

Technical Solution

In order to accomplish the above object, an aspect of the present invention provides a submerged hollow fiber membrane module, including an upper header and a lower header which are positioned parallel to each other by a predetermined distance therebetween; hollow fiber membranes arranged in a perpendicular direction between the upper header and the lower header; and a partition membrane provided to enclose the hollow fiber membranes and having slanted slit-shaped openings.

Advantageous Effects

According to the present invention, a submerged hollow fiber membrane module is configured such that an upward water flow is formed around separation membranes even in the presence of a small amount of air, thus enabling cross-flow filtration, and consequently reducing pollution of the separation membranes due to extended operation. Thus, chemical or physical cleaning cycles can be decreased, and the lifetime of the separation membranes can be prolonged, thereby lowering maintenance and repair costs of clean water or sewage/wastewater treatment plants.

Figure 1:
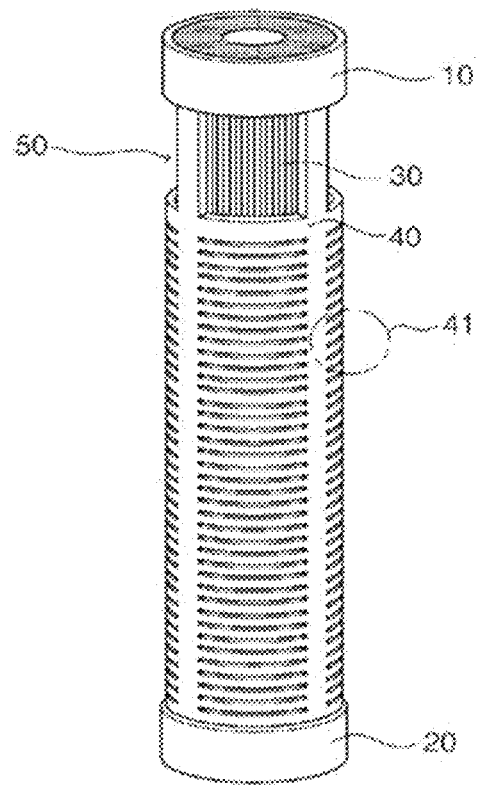
FIG. 1 is a schematic perspective view illustrating a submerged hollow fiber membrane module according to an embodiment of the present invention.

<Description of the Reference Numerals in the Drawings>

| | |
|---|---|
| 10: upper header | 20: lower header |
| 30: hollow fiber membrane | 40: partition membrane |
| 41: slit-shaped opening | 50: upper opening |

MODE FOR INVENTION

Hereinafter, a detailed description will be given of embodiments of the present invention with reference to the appended drawings. Also, in the description of the present invention, a detailed description of known general functions or constructions related thereto is omitted.

According to the present invention, a submerged hollow fiber membrane module may include a partition membrane having slanted slit-shaped openings, so that an upward water flow is accelerated, thus increasing operating efficiency of the hollow fiber membrane module, and enabling high-concentration raw water around hollow fiber membranes to be easily discharged to the outside of the module upon reverse washing.

FIG. 1 schematically illustrates the outer appearance of the submerged hollow fiber membrane module according to an embodiment of the present invention. With reference to FIG. 1 the submerged hollow fiber membrane module according to the present invention may be configured such that hollow fiber membranes 30 are provided in a perpendicular direction between a lower header 20 for supplying air to the hollow fiber membranes 30 and an upper header 10 connected to the hollow fiber membranes 30, and provided between the upper header 10 and the lower header 20 of the hollow fiber membrane module is a partition membrane 40 having slanted slit-shaped openings 41 to enclose the hollow fiber membranes 30.

The partition membrane 40 may include the slanted slit-shaped openings 41 so that, upon filtration, an upward water flow formed in the module does not diffuse to the outside of the module, and raw water outside the module is introduced into the module, thus accelerating the upward water flow, and also, upon reverse washing, high-concentration raw water around the hollow fiber membranes may be easily discharged to the outside of the module, together with a downward water flow formed in the module.

The interval between the slits may be 0.1~30 cm, but is not necessarily limited thereto.

Figure 2:
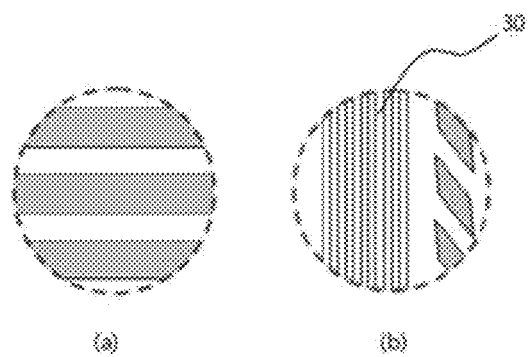
FIG. 2(a) is a partially enlarged view illustrating openings 41 when viewed from the front, and FIG. (b) is a partially enlarged view illustrating the openings 41 when the module is cut in a longitudinal direction.

FIG. 2 is of partially enlarged views of the slanted slit-shaped openings 41 of the partition membrane of the submerged hollow fiber membrane module of FIG. 1, wherein FIG. 2(a) is a partially enlarged view illustrating the openings 41 when viewed from the front, and FIG. 2(b) is a partially enlarged view illustrating the openings 41 when the module is cut in a longitudinal direction.

With reference to FIG. 2, the slit-shaped openings 41 of the partition membrane of the submerged hollow fiber membrane module according to the embodiment of the present invention are slanted downwards in an outward direction from an inside of the partition membrane, and thus, upon filtration, the upward water flow formed in the module does not diffuse to the outside of the module, and raw water outside the module may be supplied into the module. Also, because of such a configuration, upon reverse washing, high-concentration raw water around the hollow fiber membranes may be easily discharged to the outside of the module together with a downward water flow formed in the module.

The partition membrane may include an upper opening 50 which is large at the top portion thereof. When such a large upper opening 50 is formed in this way, air supplied from the lower portion of the module easily escapes from the upper end of the module to the outside, thus facilitating the control of flow of air.

The hollow fiber membranes 30 may be configured such that the average distance between the fibers is 0.01~50 mm but is not necessarily limited thereto. Although the hollow fiber membranes have to be arranged as densely as possible, when the distance between the membranes is excessively decreased to be not more than 0.01 mm, it is difficult to achieve flow of raw water and air between the membranes, undesirably causing blockage between the membranes. In contrast, when the distance between the membranes is increased to be not less than 50 mm, the membrane packing density of the module may decrease, undesirably deteriorating water treatment capability.

The lower header 20 may be provided with an air inlet (not shown), and the air inlet may have a plurality of through-holes for controlling the supply of air so that air is uniformly supplied.

A better understanding of the present invention may be obtained via the following examples which are set forth to illustrate, but are not to be construed as limiting the present invention.

Preparation Example 1

Preparation of Hollow Fiber Membrane Module

A submerged hollow fiber membrane module having a membrane area of 45 m² was prepared, including an upper header and a lower header positioned parallel to each other by a predetermined distance therebetween, hollow fiber membranes arranged in a perpendicular direction between the upper header and the lower header, and a partition membrane provided to enclose the hollow fiber membranes and having slit-shaped openings slanted at 45° relative to the longitudinal direction of the hollow fiber membranes.

Comparative Preparation Example 1

Preparation of Hollow Fiber Membrane Module

A submerged hollow fiber membrane module having the same configuration was prepared as in Preparation Example 1, with the exception that the partition membrane had slit-shaped openings orthogonal to the longitudinal direction of the hollow fiber membranes.

[Evaluation of Performance of Submerged Hollow Fiber Membrane Module]

To measure water permeability of the submerged hollow fiber membrane modules of Preparation Example 1 and Comparative Preparation Example 1, a water tank was filled with pure water containing 50 ppm of skim milk powder (protein in skim milk powder is present in the form of protein molecules and aggregates thereof in an aqueous solution, and is adsorbed to the surface of a separation membrane via hydrophobic bonding and undesirably may cause membrane blockage), and the submerged hollow fiber membrane module was mounted thereto and the water permeability thereof was measured periodically while operating the module at a suction pressure of 380 mmHg. The results are shown in Table 1 below.

TABLE 1

|  |  | Operating time | | | | | | | |
| --- | --- | --- | --- | --- | --- | --- | --- | --- | --- |
|  |  | 0 hr | 0.5 hr | 1 hr | 1.5 hr | 2 hr | 4 hr | 6 hr | 8 hr |
| Prep. Ex. 1 | Water permeability (LMH) | 312 | 215 | 165 | 153 | 140 | 146 | 153 | 143 |
|  | Decrement (%) | 100 | 69 | 53 | 49 | 45 | 47 | 49 | 46 |
| Comp. Prep. Ex. 1 | Water permeability (LMH) | 323 | 230 | 150 | 122 | 109 | 86 | 75 | 81 |
|  | Decrement (%) | 100 | 71 | 46 | 38 | 34 | 27 | 23 | 25 |

As is apparent from Table 1, compared to the submerged hollow fiber membrane module of Comparative Preparation Example 1, water permeability of the submerged hollow fiber membrane module of Preparation Example 1 was less decreased because of the slit-shaped openings slanted at 45° relative to the longitudinal direction of the hollow fiber membranes, and pollution resistance became higher.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A submerged hollow fiber membrane module, comprising:
   an upper header and a lower header which are positioned parallel to each other by a predetermined distance therebetween;
   hollow fiber membranes arranged in a perpendicular direction between the upper header and the lower header; and a partition membrane provided to enclose the hollow fiber membranes, the partition membrane having openings, each of the openings includes an inlet on an outer surface side of the partition membrane, and an outlet on an inner surface side of the partition membrane, wherein the inlet and the outlet for each of the openings are connected at a slant so that the outlet is closer to the upper header than the inlet along a longitudinal direction of the hollow fiber membranes, such that each of the openings is configured to accelerate an upward water flow as water flows in via the inlet at the outer surface side of the partition membrane and flows out via the inlet at the inner surface side of the partition membrane, so that upon filtration, the upward water flow formed inside of the partition membrane does not diffuse to the outside of the partition membrane, and raw water outside of the partition membrane is introduced into the inside of the partition membrane.

2. The submerged hollow fiber membrane module of claim 1, wherein an interval between the openings is 0.1~30 cm.

3. The submerged hollow fiber membrane module of claim 1, wherein the partition membrane further includes an upper opening at a top portion thereof.

4. The submerged hollow fiber membrane module of claim 1, wherein the hollow fiber membranes are configured such that an average distance between fibers is 0.01~50 mm.

5. The submerged hollow fiber membrane module of claim 1, wherein the lower header includes an air inlet.

6. The submerged hollow fiber membrane module of claim 1, wherein the openings are slanted at 45° relative to the longitudinal direction of the hollow fiber membranes.

7. A submergible hollow fiber membrane module, comprising:
 an upper header;
 a lower header positioned parallel to the upper header at a predetermined distance from the upper header;
 hollow fiber membranes arranged in a perpendicular direction between the upper header and the lower header; and
 a partition means disposed to enclose the hollow fiber membranes, the partition means being configured to accelerate an upward flow of water as the water flows from outside of the partition means via an inlet to inside of the partition means, and the upward flow of the water inside of the partition means does not diffuse to the outside of the partition means.

\* \* \* \* \*